United States Patent [19]
Matake et al.

[11] Patent Number: 5,923,108
[45] Date of Patent: Jul. 13, 1999

[54] CANNED MOTOR

[75] Inventors: Kozo Matake, Kawasaki; Akira Suzuki, Tokyo, both of Japan

[73] Assignees: Ebara Corporation, Tokyo, Japan; Ebara Densan Ltd., Tokyo, Japan

[21] Appl. No.: 08/901,310

[22] Filed: Jul. 28, 1997

[30] Foreign Application Priority Data

Jul. 30, 1996 [JP] Japan ................................. 8-216633

[51] Int. Cl.⁶ ............................... H02K 5/00; H02K 5/12
[52] U.S. Cl. ............................... 310/89; 310/87; 310/88; 310/71
[58] Field of Search .................. 310/87, 43, 45, 310/86, 89, 71, 88; 29/596, 598

[56] References Cited

U.S. PATENT DOCUMENTS

| | | | |
|---|---|---|---|
| 2,862,120 | 11/1958 | Onrud | 310/54 |
| 3,882,334 | 5/1975 | Newill | 310/59 |
| 4,496,866 | 1/1985 | Yamamoto et al. | 310/87 |
| 4,516,044 | 5/1985 | Bone | 310/64 |
| 4,644,210 | 2/1987 | Meisner et al. | 310/211 |
| 4,853,373 | 8/1989 | Livingston | 514/46 |
| 4,908,538 | 3/1990 | Geberth, Jr. | 310/59 |
| 5,038,853 | 8/1991 | Callaway, Sr. et al, | 165/46 |
| 5,091,666 | 2/1992 | Jarczynski | 310/54 |
| 5,113,102 | 5/1992 | Gilmore | 310/888 |
| 5,113,103 | 5/1992 | Blum et al. | 310/89 |
| 5,145,298 | 9/1992 | Marantette | 409/135 |
| 5,220,233 | 6/1993 | Birch et al. | 310/156 |
| 5,250,863 | 10/1993 | Brandt | 310/54 |
| 5,293,089 | 3/1994 | Frister | 310/54 |
| 5,497,040 | 3/1996 | Sato | 310/67 R |

FOREIGN PATENT DOCUMENTS 07067292   3/1995   Japan .

*Primary Examiner*—Thomas M. Dougherty
*Assistant Examiner*—Tran N. Nguyen
*Attorney, Agent, or Firm*—Armstrong, Westerman, Hattori, McLeland & Naughton

[57] ABSTRACT

A light weight and compact canned motor having a high cooling efficiency while maintaining its mechanical properties has been developed. The canned motor has a connection end connected to a driven equipment and a free end and comprises a rotor shaft protruding from the connection end; a cylindrical thin-walled can member defining a rotor chamber for housing the rotor shaft and a rotor; a cylindrical thin-walled frame body defining a stator chamber outside of the can member for housing a stator; a connection end plate for covering a connection end opening of the stator chamber; and a free end plate for covering a free end opening of the stator chamber.

18 Claims, 6 Drawing Sheets

F I G. 1
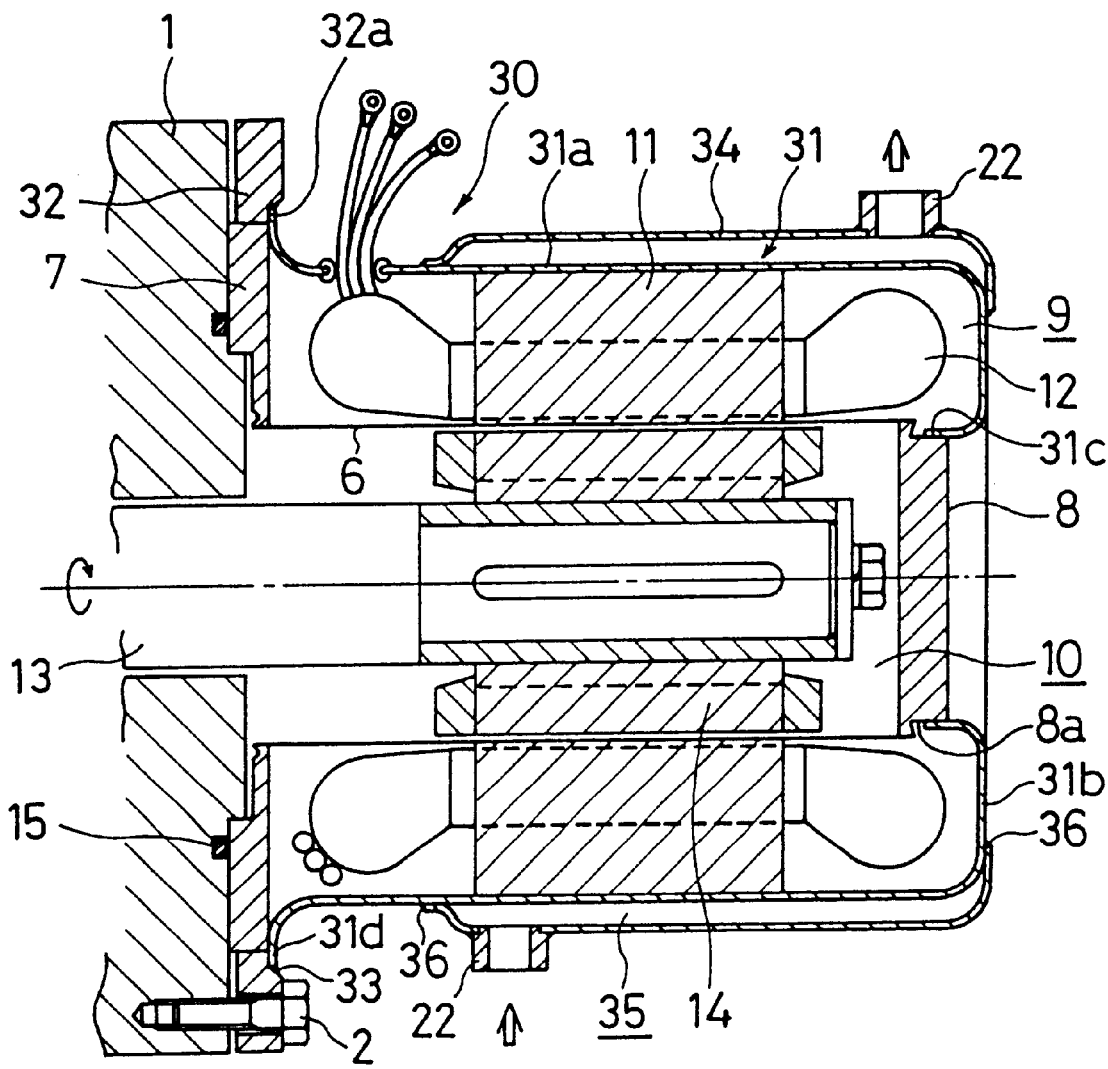
F I G. 3
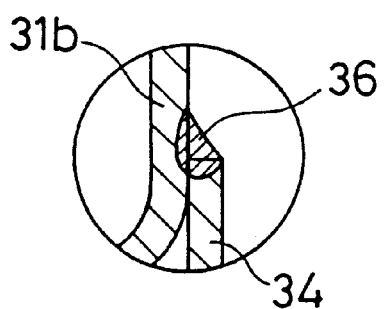

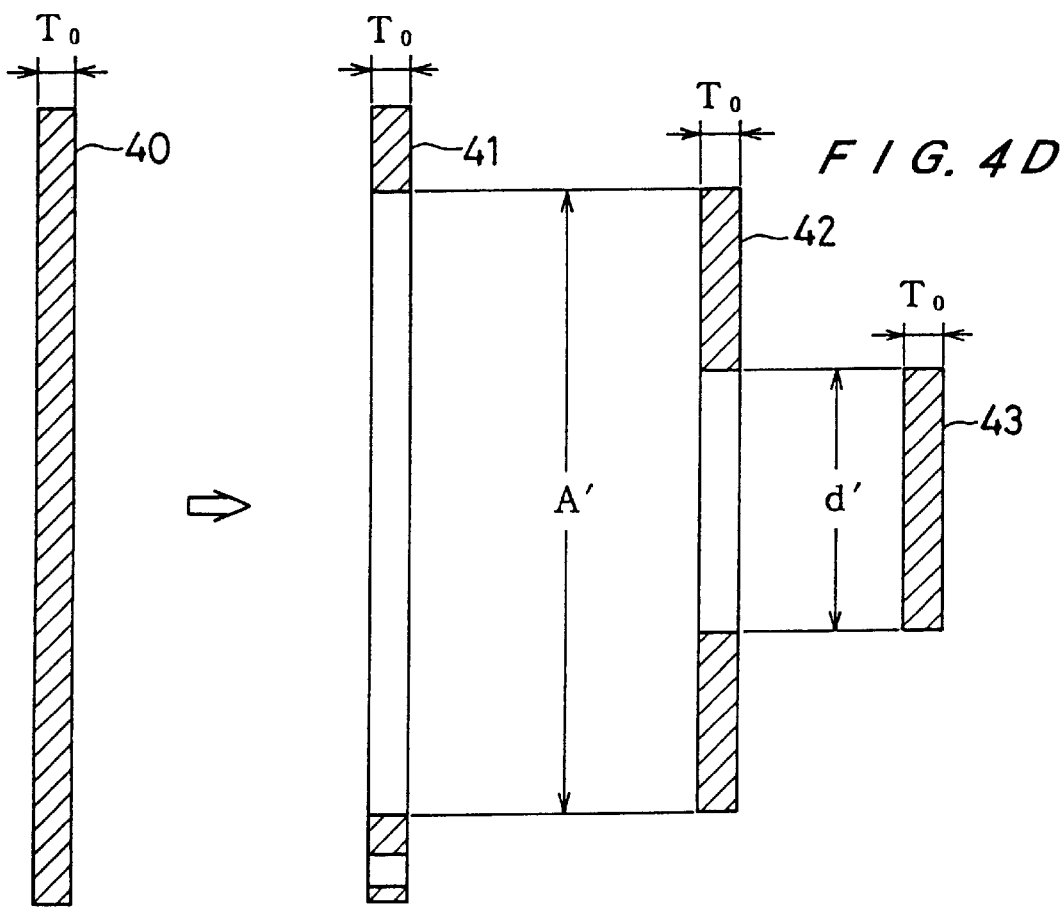

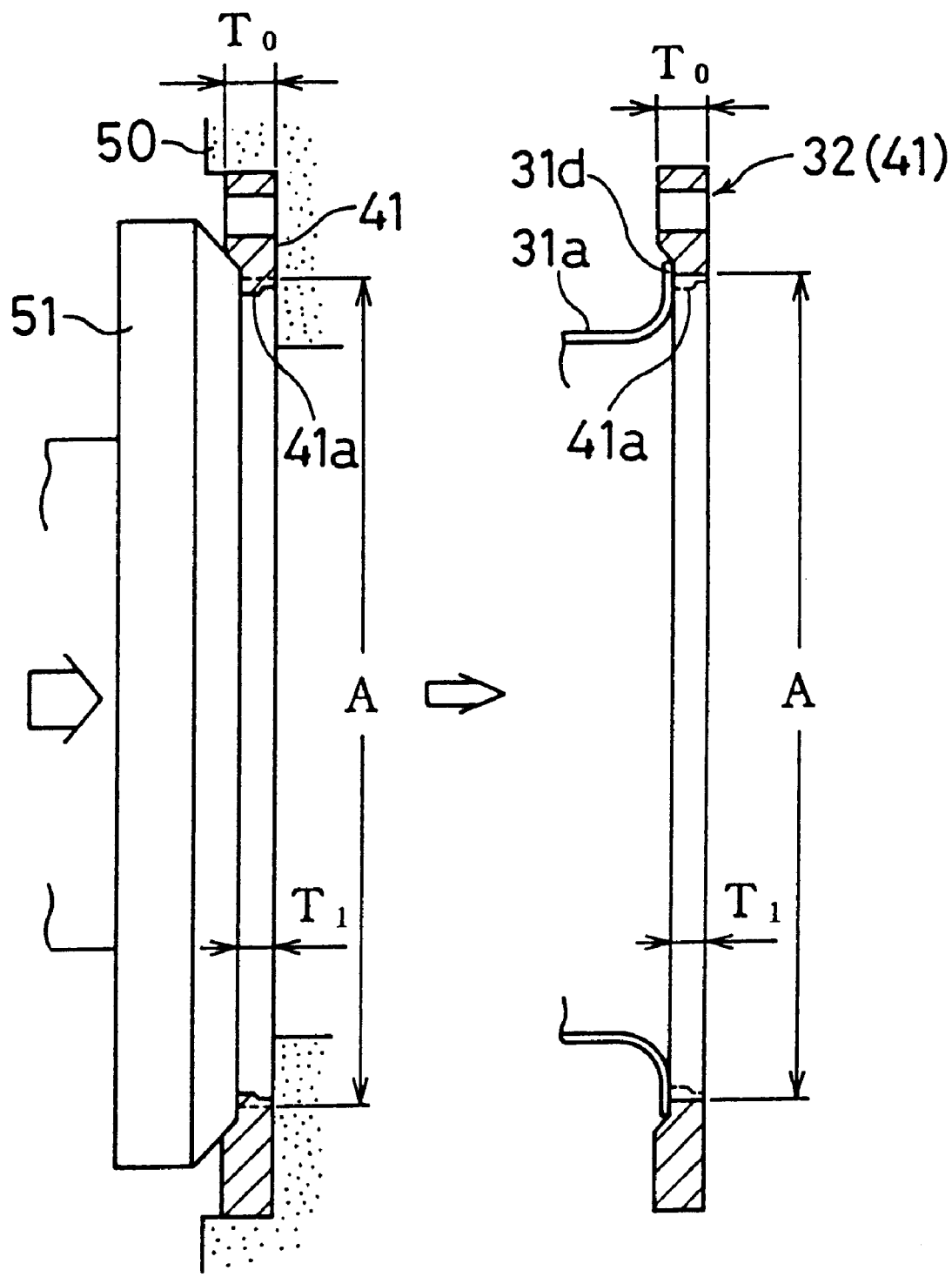

1

CANNED MOTOR

BACKGROUND OF THE INVENTION

1. Field of the Invention

The present invention relates to a canned or sealed motor suitable for use in a vacuum pump whose shaft is directly coupled to the shaft of a drive motor.

2. Description of the Related Art

Conventional types of canned motor used to drive vacuum pumps are shown in FIGS. 8 and 9. Typically, the canned motor has a water-cooled cast iron motor frame 3 whose connection end is attached to a casing 1 of the vacuum pump by means of fasteners, such as bolts 2. Inside the motor frame 3, there is disposed a thin-walled can 6 of a cylindrical shape, and the opening between the can 6 and the motor frame 3 at the connection end is covered by a connection end plate 7, and the opening between the can 6 and the motor frame 3 at a free end is covered by a free end plate 8, thereby forming the stator chamber 9 and the rotor chamber 10 isolated from each other.

The stator chamber 9 houses a fixed stator 11 with its windings 12, and the rotor chamber 10 houses a rotatable rotor 14 attached to an end of a pump shaft 13. There is some clearance provided between the can 6 and the rotor 14, and an O-ring 15 is disposed between the pump casing 1 and the connection end plate 7 so that the rotor chamber 10 is maintained in a vacuum similar to the interior of the vacuum pump.

The example shown in FIG. 8 has a cooling water chamber 5 defined in a cooling pipe 4 spirally embedded in the wall of the motor frame 3. On the other hand, the example shown in FIG. 9 has a cooling water chamber 24 defined in a cooling water jacket 22, made by welding an inner tube 20 to an outer tube 21 of a corrosion resistant material, such as stainless steel, mounted on the outer wall of the motor frame 3. Details are disclosed in a Japanese Utility Model Application, Laid Open Publication, H6-88170.

The motor frame 3 is intended to provide assured cooling of the motor, as well as to perform a high precision positioning of the elements, such as the stator 11, the windings 12 and the can 6 with respect to the rotor 14, by holding those elements during the assembly of the vacuum pump.

However, all of these conventional pump frames 3 are made of cast iron, and their thick-walled construction presents a serious drawback to developing a compact and light weight motor. Additionally, in the example shown in FIG. 8, a core mold is necessary for casting the frame having a jacket structure, leading to complex manufacturing steps and consequent increase in a manufacturing cost. For the example shown in FIG. 9, because of the thick-wall separation between the cooling medium and the heat source, cooling efficiency is relatively poor, making it difficult to derive optimum performance from the motor.

SUMMARY OF THE INVENTION

It is an object of the present invention to provide a light weight and compact canned motor having a high cooling efficiency while maintaining its mechanical properties.

The object has been achieved in a canned motor having a connection end connected to a driven equipment and a free end comprising: a rotor shaft protruding from the connection end; a cylindrical thin-walled can member defining a rotor chamber for housing the rotor shaft and a rotor; a cylindrical thin-walled frame body defining a stator chamber outside of the can member for housing a stator; a connection end plate for covering a connection end opening of the stator chamber; and a free end plate for covering a free end opening of the stator chamber.

According to the canned motor presented above, the construction feature of the motor which comprises a frame body and a can member both made of a thin-walled cylindrical shape, and a connection end plate and free end plate for reinforcing the frame body and the can member, has enabled the weight of the motor as a whole to be reduced while maintaining the mechanical strength thereof. Furthermore, attaching the cooling jacket by welding to the outer surface of the motor frame has enabled much more direct cooling to be applied to the motor through the thin wall of the motor frame. By making the frame body by deep drawing without resorting to welding, and by carefully welding the jacket member to the motor frame so as not to degrade the structural integrity of the interior of the frame body, a trace of corrosion can be detected first on the outside of the canned motor, because even if corrosion attacks the welded sections, the cooling water will seep out to the exterior of the canned motor before it seeps into the interior of the canned motor to cause electrical problems in the stator chamber.

An aspect of the canned motor is that the end plates may be made of a material which is not corrosion resistant such as carbon steels, thus reducing the cost of making the canned motor.

Another aspect of the canned motor is that the free end plate and the frame end plate are made of a same material, thus improving the material utilization and contributing to reducing the cost of manufacturing the canned motor.

Another aspect of the canned motor is that a frame end plate is fitted at an outer periphery of the connection end plate, the frame end plate being provided with an annular step section for receiving a connection end opening of the frame body. Accordingly, motor assembly is facilitated by enabling tp be accurately centered and aligned the rotor shaft with the driven equipment, thus enabling production of motor integrated equipment, such as a motor driven pump with stable performance.

Another aspect of the canned motor is that the frame end plate is welded to the frame body, and a plate thickness of a step section for weldment is thinner than a remainder part of the frame end plate. Accordingly, the material squeezed out in the process of making the step section provides an allowance for machining of the mating surfaces of the frame end plate and the free end plate.

BRIEF DESCRIPTION OF THE DRAWINGS

FIG. 1 is a cross sectional view of a first embodiment of the canned motor of the present invention.

FIG. 3 is an enlarged view of the section "a" shown in FIG. 2.

FIGS. 4A–4D are a cross sectional view to explain the process of making a frame attachment plate, a connection end plate and a free end plate of a frame member from one starting sheet.

FIGS. 5A–5B are a cross sectional view to explain the process of making a frame attachment plate from a starting sheet shown in FIG. 4.

DESCRIPTION OF THE PREFERRED EMBODIMENTS

Figure 2:
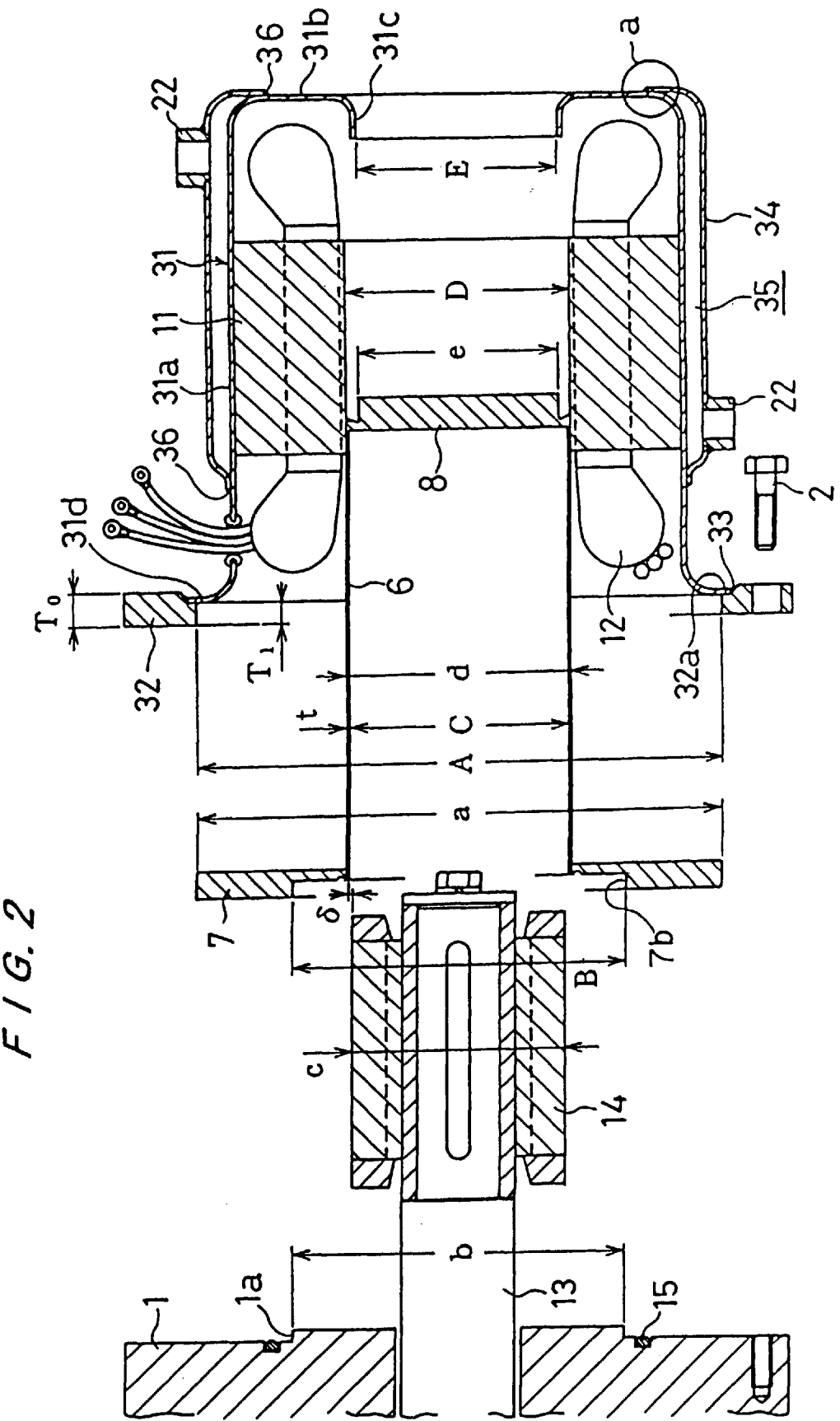
FIG. 2 is a detailed exploded view of the canned motor shown in FIG. 1.
Figure 6:
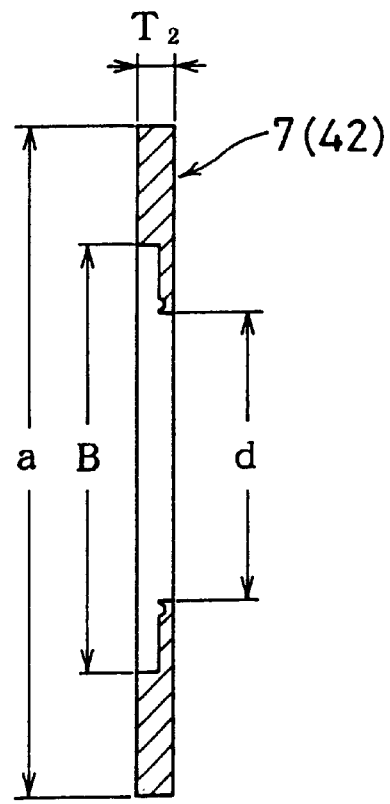
FIG. 6 is a cross sectional view to explain the process of making a free end plate from a starting sheet shown in FIG. 4.
Figure 7:
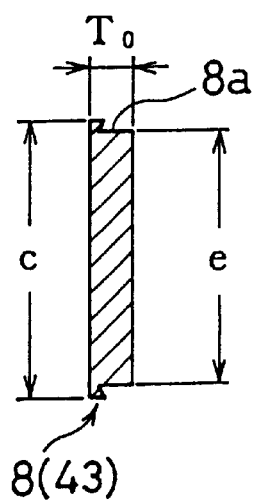
FIG. 7 is a cross sectional view to explain the process of making a free end plate from a starting sheet shown in FIG. 4.
Figure 8:
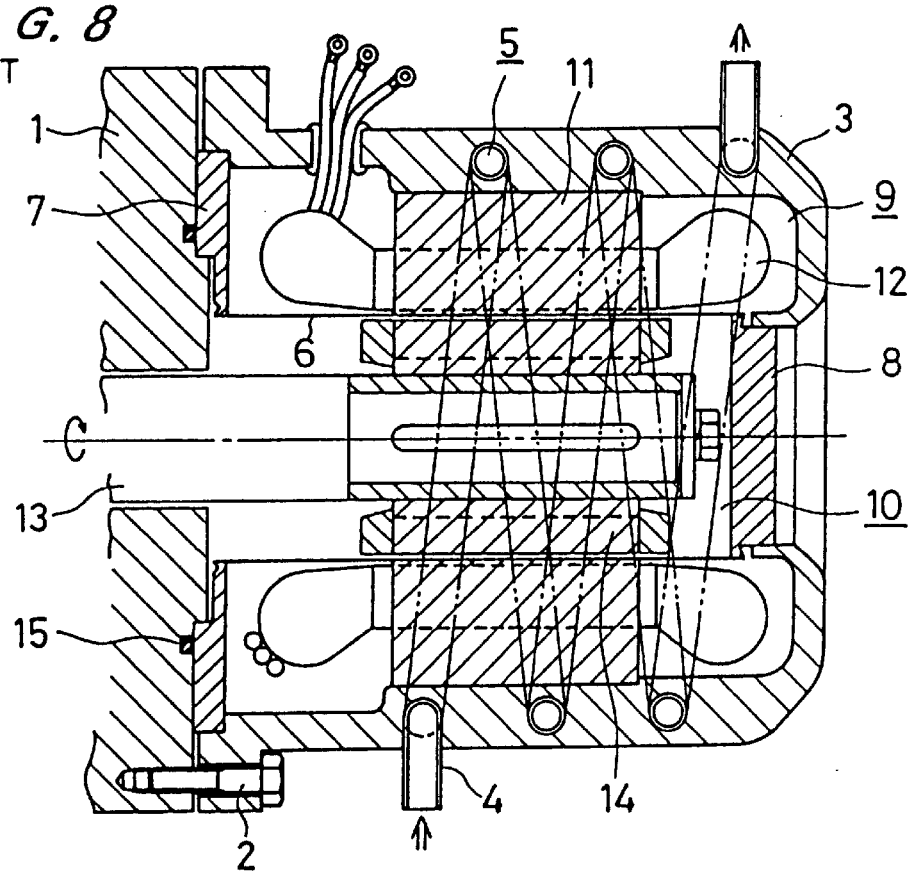
FIG. 8 is a cross sectional view of an example of the construction of a pipe cooled conventional canned motor.
Figure 9:
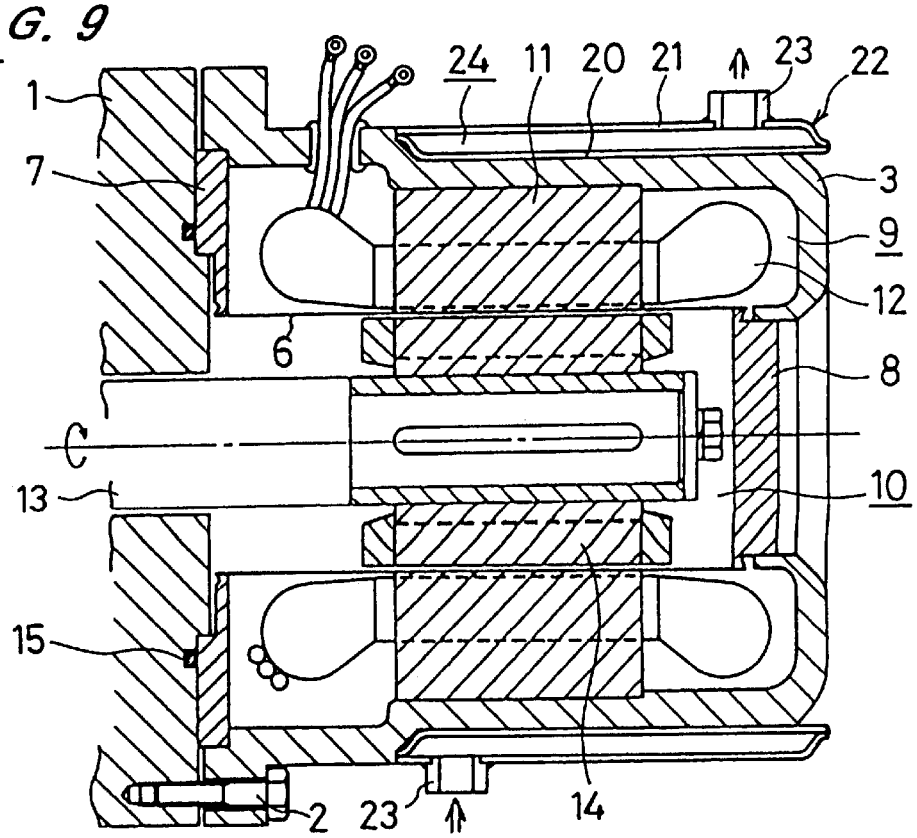
FIG. 9 is a cross sectional view of another example of the construction of a jacket cooled conventional canned motor.

Preferred embodiments will be presented in the following with reference to FIGS. 1 to 7. In the drawings, those parts of the canned motor which are the same as those in the conventional models are referred to by the same reference numerals, and their explanations are omitted. The canned motor is applied to drive a vacuum pump and is housed in a motor frame 30 attached to the pump casing 1 with bolts 2.

The motor frame 30 comprises a frame body 31 made by forming and fabricating corrosion resistant thin sheet metal and a frame end plate 32 of a disc shape with a hollow center. The connection end plate 7 is inserted in the hollow center of the frame end plate 32. The opening on the free end of the rotor chamber 10 is covered with a free end plate 8. The frame end plate 32, the connection end plate 7 and the free end plate 8 are produced from a relatively thick carbon steel plate by die cutting or laser beam cutting and the like followed by necessary fabrication steps. These end plates 32, 7 and 8 are not particularly required to be corrosion resistant, and since they are relatively thick, the use of non-corrosion resistant materials contribute significantly to reducing the manufacturing costs.

The frame body 31 is made, in this embodiment, by deep drawing of a thin stainless sheet to produce an outer tube section 31a provided with an integral end-closure section 31b, on the free end of the motor, continuous with a coupling end section 31c extending in the inner axial direction. Also, a peripheral attachment section 31d is formed at the connection end of the outer tube section 31a. Therefore, the frame body 31 itself is made without any welded sections. The outer periphery of the connection end plate 7 is fitted into the inner periphery of the frame end plate 32, and both planar surfaces of the connection end plate 7 are clamped between the end section of the frame body 31 and the pump casing 1.

The inner periphery of the frame end plate 32 has a thin step section 32a, and the peripheral attachment section 31d of the frame body 31 is placed in the thin step section 32a to constitute a weld section 33, for attaching the frame body 31 to the frame end plate 32. By adopting this configuration, the stepped surface of the step section 32a serves the purpose of positioning the frame body 31 as well as providing a space for a welding groove.

On the connection end, the can 6 is in contact with the center hollow section of the connection end plate 7 to be fixed in place by welding to the inner periphery, and on the free end, it is in contact with a stepped section 8a of the free end plate 8 to be fixed in place by welding. The frame end plate 32 is fixed to the pump casing 1 with bolts 2, with an intervening O-ring 15 for hermetic sealing, thereby forming an airtight rotor chamber 10 on the interior space of the can 6.

This type of construction of the motor frame 30, in which a thin-walled frame body 31 is welded to a relatively thick frame end plate 32, has enabled the achievement of a reduction in weight for the overall for frame 30 while strenghtening the overall structure by increased stiffness of the frame end plate 32, so that the size of the motor can be made more compact.

A cooling chamber 35 is formed around the frame body 31 by following steps. First, a jacket plate 34 is formed by rolling a thin sheet made of a corrosion resistant material such as stainless steel into a cylindrical shape, followed by spinning lathe processing. The jacket plate 34 is then welded on the outer periphery of the frame body 31 to form a space for flowing a cooling medium therebetween. The jacket plate 34 is provided with a pair of couplers 22, attached by welding, for admitting and discharging cooling water. This construction of the motor frame 30, where a cooling chamber 35 is formed by attaching the jacket plate 34 made of thin sheet to the outer surface of the frame body 31 made of thin sheet, enables the simplification of the fabrication process and yet to achieve highly efficient cooling.

The jacket plate 34 is attached by holding both ends of the jacket plate 34 against the outer surface of the frame body 31 and fastening them by way of two annular welded sections 36, as shown in FIG. 3, which is an enlarged view of a welded section "a" in FIG. 2. In this embodiment, the thickness of the frame body 31 is made thicker than that of the jacket plate 34, and the heat input during the welding process is adjusted so that there is not any weld bead penetration through the material of the frame body 31 in either of the two welded sections 36. The significance of this precaution is that, even if corrosion should proceed in annular welded sections 36, there would be no corrosion path which can penetrate into the interior of the motor through the annular welded sections 36, and that the water will be leak to the outside of the jacketplate 34, before it can proceed into the interior of the frame body 31, thus enabling a water leak to be discovered before it deteriorates electrical insulation quality or generates fault current.

The steps for manufacturing a canned motor having the construction presented above will now be presented with reference to FIGS. 4A–4D.

In this embodiment, the frame end plate 32, the connection end plate 7 and the free end plate 8 are made of the same material so as to minimize material waste. As shown in FIG. 4A, a sheet material 40 having a thickness "$T_0$" and an outer diameter equal to that of the frame end plate 32 is used so that a frame end plate stock 41 may be die cut or laser cut from a plate material 40, as shown in FIG. 4B. The frame end plate stock 41 is further subjected to die cutting to punch out a connection end stock 42 of an outer diameter "A'", as shown in FIG. 4C, and a free end stock 43 of an outer diameter "d'", as shown in FIG. 4D, can be punched out from the remainder.

The inner peripheral dimension of the frame end plate 32 and the outer peripheral dimension of the connection end plate 7 are critical because they serve as the concentric alignment guide for coupling the pump shaft to the rotor shaft. Consequently, they must be fabricated to be a tight fit as well as to be of a precision finish, and the later requires a certain amount of machining allowance. The machining allowance is created by a process illustrated in FIG. 5A. While the outer peripheral edge and the bottom surface of the frame attachment stock 41 are supported in a jig 50, the open surface of the stock 41 is pressed with a press die 51 to crush the inner periphery of the frame attachment stock 41 in the thickness direction to produce a thickness value of "$T_1$" at the inner periphery of the frame attachment stock 41 so that the reduced thickness will create a smaller inner diameter corresponding to the machining allowance 41a. As shown in FIG. 5B, after the frame body 31 has been welded, the inner periphery of the frame end plate 32 is machined to produce the final dimension "A". In the cases of the free end stock 42 and the free end plate stock 43, there is no need to carry out extra steps, because there is sufficient thickness of the plates for machining allowances, and they can be fabricated directly.

The assembling operation of the canned motor will be presented with reference to FIG. 2. First, the connection end plate 7 with a center hole is attached to the connection end of the can $6^r$ and the free end plate 8 of a solid disc shape is attached to the inner periphery at the free end of the can 6, respectively, by a suitable method such as welding. The inner diameter "A" of the frame end plate 32 is about the same as or slightly less than the outer diameter "a" of the connection end plate 7, and the outer diameter "E" at the free end opening of the frame body 31 is about the same as, or lightly less than, the outer diameter "e" at the free end of the free end plate 8. The inner diameter "D" of the stator 11 is about the same as or slightly larger than the outer diameter "d" of the can 6. Also the peripheral attachment section 31$d$ is fitted into, and welded to, the step section 32$a$ of the frame end plate 32.

In this embodiment, after the stator is coupled into the frame, the inner periphery of the frame end plate 32, the inner periphery of the coupling end section 31$c$ and the end surface of the peripheral attachment section 31$d$ are machined with reference to the inner periphery of the stator so as to obtain highly precise concentricity with the rotor 14 and pump shaft 13, and orthogonality of the motor frame 30 to the pump shaft 13.

The can 6 is inserted into the motor frame 30 at this stage of assembly to couple the connection end plate 7 into the frame end plate 32, and the step section 8$a$ of the free end plate 8 into the coupling end section 31$c$ of the frame body 31, thus positioning the can 6. Next, the rotor 14 is assembled precisely within the rotor chamber 10 which is defined inside the can 6 through the above described process. The rotor 14 is pre-attached to the end of the pump shaft 13 so as to rotate together with the pump while maintaining a precise small clearance δ between the outer diameter "c" of the rotor 14 and the inner diameter "C" of the can 6.

The pump casing 1 is provided with a protrusion section 1$a$ of an outer diameter "b" while the connection end plate 7 is provided with a coupling depression section 7$b$ of an inner diameter "B", so that the protrusion section la can be coupled with the depression section 32$b$. The frame end plate 32 is then attached to the pump casing 1 by means of bolts 2 through an intervening O-ring 15. The connection end plate 7 is pressed towards the casing 1 by the bolts 2, aided by elastic coupling of the frame body 31, to compress the O-ring 15 and hermetically seal the coupling. The frame end plate 32 and the connection end plate 7 are precision machined to provide a precise alignment of the can 6 and the stator 11 with respect to the rotor 14.

It has been demonstrated that, by constructing the frame body with stainless sheet material, and directly cooling it by a cooling jacket made of the same corrosion resistant material, a compact and light weight vacuum pump with a high cooling efficiency can be provided. The motor frame is constructed with two component members, and, only the frame body is formed from corrosion resistance material while the frame end plate requiring only stiffness can be produced from ordinary carbon steels. Therefore, sufficient mechanical strength has been retained while enabling to achieve lower manufacturing costs.

Furthermore, the frame body is made without weld beads penetrating the material sheet so that the adverse effect of welding, in degrading the anti-corrosion properties of the material, would not be introduced, even when the cooling water is highly corrosive so that leaks of cooling water can be readily observed from outside long before any leaks to be developed to cause operational problems such as fault current in the motor. Improvements in material utilization has been brought about by arranging the die or lazer cutting process so that the material remaining from making frame end plate stock may be utilized to make the connection end plate and the free end plate. Furthermore, the step section provided on the inner periphery of the frame end plate serves to facilitate the process of positioning the frame body for welding and to accommodate the weld bead.

What is claimed is:

1. A canned motor having a connection end connected to a driven equipment and a free end, said canned motor comprising:

a rotor shaft protruding from said connection end;

a cylindrical thin-walled can member defining a rotor chamber for housing said rotor shaft and a rotor;

a cylindrical thin-walled frame body defining a stator chamber outside of said can member for housing a stator, said frame body being formed through a deep drawing process;

an annular connection end plate for covering a connection end opening of said stator chamber;

a free end plate for covering a free end opening of said stator chamber; and an annular frame end plate concentric with said connection end plate, said frame end plate having an opening whose diameter is greater than the cylindrical wall of said frame body;

said frame body having an end radially expanded and joined to said frame end plate to form an outwardly extending peripheral attachment section; and means for connecting said frame end plate to said driven equipment whereby said peripheral attachment section of said frame body clamps said connection end plate to said driven equipment.

2. A canned motor according to claim 1, wherein said frame body is made of a corrosion resistant sheet material, including stainless steels.

3. A canned motor according to claim 1, wherein said connection end plate is made of a carbon steel material which is not corrosion resistant.

4. A canned motor according to claim 1, wherein a cooling jacket is provided on an outer surface of said frame body for cooling said canned motor.

5. A canned motor according to claim 4, wherein said frame body is integrally formed with a free end wall for covering a free end of said stator chamber.

6. A canned motor according to claim 5, wherein an inner edge of said free end wall is fixed to said free end plate.

7. A canned motor according to claim 6, wherein said inner edge of said free end wall is provided with a cylindrical coupling end section for being fixed to an outer surface of said free end plate.

8. A canned motor according to claim 5, wherein a frame end plate is fitted at an outer periphery of said connection end plate, said frame end plate being provided with an annular step section for receiving a connection end opening of said frame body.

9. A canned motor according to claim 8, wherein said frame end plate, said connection end plate and said free end plate are formed of the same thickness and the same material.

10. A canned motor according to claim 8, wherein said frame end plate and said connection end plate are made of a same material.

11. A canned motor according to claim 8, wherein said frame end plate is welded to said frame body.

12. A canned motor according to claim 1, wherein a positioning engagement section is provided between said connection end plate and said driven equipment.

13. A canned motor according to claim 4, wherein said cooling jacket is made of a corrosion resistant sheet material and is welded to said frame body so that a weld bead does not penetrate said frame body.

14. A canned motor having a connection end connected to a driven equipment and a free end, said canned motor comprising:

a rotor shaft protruding from said connection end;

a cylindrical thin-walled can member defining a rotor chamber for housing said rotor shaft and a rotor;

a cylindrical thin-walled frame body defining a stator chamber outside of said can member for housing a stator, said frame body being formed without a weld bead penetrating through its thickness;

an annular connection end plate for covering a connection end opening of said stator chamber;

a free end plate for covering a free end opening of said stator chamber; and an annular frame end plate concentric with said connection end plate, said frame end plate having an opening whose diameter is greater than the cylindrical wall of said frame body;

said frame body having an end radially expanded and joined to said frame end plate to form an outwardly extending peripheral attachment section; and means for connecting said frame end plate to said driver equipment whereby said peripheral attachment section of said frame body clamps said connection end plate to said driver equipment.

15. A method of forming a canned motor having a connection end connected to a driven equipment and a rotor shaft protruding from said connection end, said method comprising the steps of:

providing a frame end plate, a connection end plate and a free end plate of metal material of predetermined thickness, said end plates being annularly shaped and in which said frame end plate has an inner diameter conforming substantially to the outer diameter of said connection end plate, and said connection end plate has an inner peripheral opening for passage of said rotor shaft;

providing a cylindrical thin-walled can member defining a rotor chamber;

affixing said free end plate to one end of said can member to close said one end and affixing the other end of said can member to said inner peripheral opening of said connection end plate;

providing said frame end plate with a step section adjacent to, and concentric with, said inner diameter thereof;

providing a cylindrical thin-walled frame body of a diameter sufficiently greater than said can member to define a chamber housing a stator;

forming said thin-walled frame body with a concentric opening at one end for cooperating with said free end of said frame body;

radially spreading the other end of said frame body to a diameter to be received on said step section of said frame end plate and bonding said frame body to said step section; and, connecting said frame end plate to said equipment concentrically about said connection end plate whereby said other end of said frame body overlies said connection end plate to clamp said connection end plate against said equipment and to join said one end of said frame body to said free end plate.

16. A method of forming a canned motor according to claim 15 including the step of providing a cylindrically formed jacket plate, having mutually spaced openings for the circulation of cooling fluid, of a diameter greater than the diameter of said frame body, and joining the axial ends of said jacket plate to said frame body to form a cooling jacket for cooling said canned motor.

17. A method of forming a canned motor according to claim 15 including the step of cutting said frame end plate, said connection end plate and said free end plate from a same material plate.

18. A method of forming a canned motor according to claim 17 including the step of crushing the inner periphery of said frame end plate in the thickness direction to form said step section therein and to reduce the diameter of the inner periphery thereof into substantial conformity with the outer diameter of said connection end plate.

* * * * *